United States Patent Office 3,144,250
Patented Aug. 11, 1964

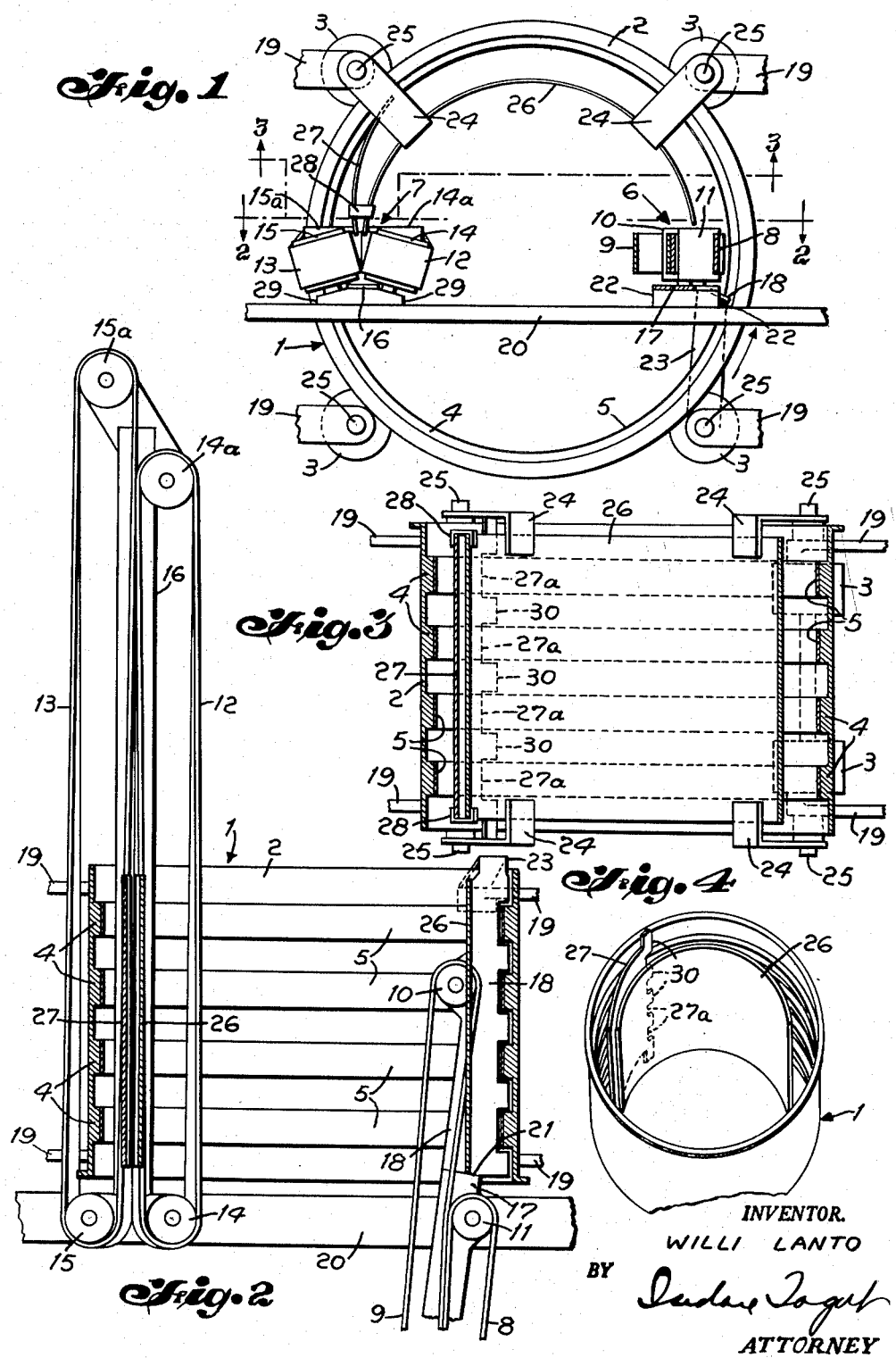

3,144,250
ARRANGEMENT FOR THE TURNING-OVER OF FLAT DISPATCH ARTICLES
Willi Lanto, Berlin-Lichterfelde, Germany, assignor to International Standard Electric Corporation, New York, N.Y., a corporation of Delaware
Filed Sept. 27, 1961, Ser. No. 141,106
Claims priority, application Germany Oct. 3, 1960
5 Claims. (Cl. 271—2)

This invention relates to an arrangement for turning over flat articles, such as, for example, letters and postcards in mail handling systems.

With respect to the handling of documents, in particular of mail items, such as letters and postcards, it is necessary to feed the individual documents, with the aid of a conveying system, to a sorting operator's desk so that they will arrive at the desk in a proper readable position. Since these documents mostly have an oblong shape it is easy to align them so that they will stand upright on one of their longitudinal edges. But still the documents may assume four different positions in relation to the operator, of which only one position is the proper reading position. Accordingly, most of the dispatch articles have to be turned over by 180° either about an axis extending transversely in relation to the conveying direction, or about an axis extending in the conveying direction. On the average every fourth dispatch article has to be turned over twice and every second article must be turned over once. From this it can be seen that on the average every second dispatch article has to be turned about an axis extending in the conveying direction.

Arrangements adapted to solve this problem are known. They mainly employ two parallel-extending conveyor belts, between which the items to be conveyed are guided, and which extend in a 180° staggered relation. Arrangements are also known in which the parallel-extending conveyor belts are guided in a helical way around a cylinder. These conventional types of arrangements are very expensive and, above all, require much space. Moreover, the dispatch article, when subjected to a turning process carried out by one of these conventional arrangements, is displaced in its relation to the conveyor belt, and one of its edges has to be re-aligned with the aid of additional measures, e.g. with the aid of slanting conveyor rollers or brushes.

The present invention relates to an arrangement which is aimed at avoiding these disadvantages, hence which does not require any additional arrangements for aligning the turned dispatch articles, and can be accommodated in a relatively small space. The inventive arrangement serves to turn flat dispatch articles, in particular letters and postcards, by 180° about an axis extending in the conveying direction. The arrangement includes a charging and a discharging conveyor belt or a pair of belts respectively, an a transfer device arranged therebetween. Accordingly the invention consists in that for the transfer of a dispatch article from the output of the delivery belt or pair of belts respectively, to the discharging belt, there is a drum rotating about its axis, on the inside of which, and near the inside wall of which, there is oppositely disposed the delivery and the discharging belt or pair of belts respectively, having the same conveying direction, and not being connected to the drum.

The inside wall of the drum is provided with a friction coating for delivering the dispatch articles, which are transferred along the inside wall, upon rotation of the drum, to the input of the pair of discharging belts. The centrifugal force exerted by the dispatch articles upon the inside wall of the drum cause them to retain their position so that they are delivered, after half a rotation, in the proper position to the discharging device. In order to facilitate the transfer, there may be provided a stripping plate.

For a more comprehensive understanding of the invention reference may be made to the accompanying drawing, in which FIGURE 1 is a side elevational view of apparatus for turning over flat articles in accordance with my invention;

FIGURE 2 is a cross-sectional view of the apparatus of FIGURE 1 taken along the lines 2—2;

FIGURE 3 is a cross-sectional view of the apparatus of FIGURE 1 taken along the lines 3—3; and FIGURE 4 is a perspective view of the drum, guide plate, and stripping plate of FIGURE 1.

Referring now to the drawings, there is shown a drum 1 mounted on eight rollers 3. The rollers are in contacting relation with shell 2 of drum 1. These rollers extend over a portion of the shell surfaces in the direction of their axes. One or more of them are driven in order to rotate the drum. Peripheral ribs 4 are arranged in spaced relationship with respect to each other along the interior of shell 2. The ribs 4 are provided with a friction coating 5.

Input conveyor system 6 and output conveyor system 7 deliver flat articles to drum 1 and then convey the turned over articles away from the drum. The input or charging conveyor system 6 comprises two endless belts 8 and 9. Conveyor 9 projects into the drum and is guided around pulley 10. Conveyor 8 is disposed adjacent conveyor 9 up to the entrance of drum 1 where it is guided around pulley 11. Output conveying system 7 consists of endless belts 12 and 13 which are guided around pulleys 14, 14a, 15 and 15a. Pulleys 15 and 15a are disposed on a straight line passing through shell 2 of drum 1 and guide belt 13 so that a portion of the working portion of belt 13 is disposed inside drum 1.

Drum 1 could be aranged vertically rather than horizontally as shown. However the preferred arrangement is the one illustrated as the output conveyors can be arranged to cooperate with a slideway 16 which aligns the lower edges of the conveyed articles. Also slideways 17 and 18 may be provided for aiding the conveyance of incoming articles. It is to be noted that a portion of slideway 18 is disposed at an angle with reference to the horizontal axis of drum 1 so that documents fed to slideway 18 by the input conveyor system 6 will fall against the friction coating 5 on the ribs 4 of drum 1.

Supports 19 are provided for rotatably supporting rollers 3. Pulleys 11, 14, and 15 are rotatably supported on bar 20 via brackets 22 and 29. Slideway 17 is rigidly connected to slideway 18 at junction 21 and supported on brace 20 by bracket 22. Slideway 18 is supported at its end opposite to slideway 17 by supporting bracket 23 which is rigidly connected to the roller 3 nearest to it. Pulley 10 is rotatably mounted on slideway 18.

Semi-circular guide 26 is supported by brackets 24 which are rigidly attached to pivots 25 upon which rollers 3 are rotatably mounted. Guide 26 deflects articles, which fall away from ribs 4 of drum 1, back to either the input or output conveyor systems. A stripping plate 27 may also be provided for positively directing articles, retained by friction coating 5 and centrifugal force against ribs 4 of drum 1, between the output conveyor belts 12 and 13. Stripping plate 27 is supported by brackets 28 which connect it to guide 26 at its ends. Plate 27 has slots 27a which cooperate with ribs 4 so that projections 30 are disposed underneath articles conveyed by drum 1 to move the articles away from drum 1 and guide them to output conveyor system 7.

The arrangement described operates as follows:
Flat articles or letters are carried by input conveyor system 6 via slideway 17 to slideway 18. The articles fall against ribs 4 while the drum is rotating in the direction of the arrow shown n FIGURE 1. Due to centrifugal force the articles are forced against ribs 4 and retained by coating 5. The rotation of drum 1 carries the articles towards stripping plate 27 which removes them from coating 5 and guides them into the space between conveyor belts 12 and 13. The articles are then conveyed by output conveying system 7 out of drum 1 and to any further processing desired. The article or letter has of course been turned over due to the 180° rotation effected by drum 1.

The arrangement of the pairs of belts with respect to one another within the drum space may be chosen at will. It is not necessary for both devices to be arranged at diametrically opposite points within the drum space. According to the available space, these devices may be arranged either more closely together or further apart. The drum has a diameter of about 30 cm., and a height of 30 cm. These dimensions are suitable for the handling of ordinary letters. For handling other documents or items, the dimensions have to be changed to meet the respective requirements. A circumferential speed of 3 m./sec. is regarded as sufficient, although deviations therefrom may be necessary in some special cases.

The turning-over arrangement according to the invention is directly inserted into the conveying section. It is easy to recognize that by this insertion the entire conveying section only needs to be enlarged by the overlapping amount of the two conveying belt pairs at the drum. In the direction extending vertically in relation to the conveying direction only the diameter of the drum will have to be considered when dimensioning the space required. This results in an additional space requirement which is so small that the arrangement may be included in any type of conveying system.

However, it is also possible to lead the discharge conveyor belt out of the drum in a direction oppositely to the conveying direction of the delivering or charging belt, hence on the same side as this belt. A return of the discharging belt will then result in an additional turning-over of the document or mail item by 180° about an axis extending vertically in relation to the conveying direction.

While the invention has been described above in conjunction with specific embodiments, it is to be understood that this description is made only by way of example and not as a limitation to the scope of the invention as set forth in the objects thereof and in the accompanying claims.

What is claimed is:

1. Apparatus for turning over flat articles by 180° about an axis extending in the conveying direction comprising: a drum, means for rotating said drum about a horizontal axis, an input edgewise conveying system for delivering the flat articles in a vertical position adjacent to the interior wall of said drum, means for retaining said articles against said interior wall, and an output edgewise conveying system for removing said articles from said interior wall of said drum in a vertical position at a point on the circumference of said drum 180° distant from the input position of said articles.

2. Apparatus according to claim 1 further comprising ribbed portions on the interior wall of said drum peripherally disposed in spaced relationship with respect to each other along said interior wall, and a stripping plate comprising projecting portions and slots which cooperate with said ribbed portions to remove articles retained against said ribbed portions away from said ribbed portions and guides said articles to said output conveyor system.

3. Apparatus according to claim 2 further comprising a semi-circular guide plate disposed within said drum in such a manner that articles which are not retained against said ribbed portions are deflected back to the input conveying system if they are in their first 90° of rotational travel and deflected forward to the output conveying system if they are in their last 90° of rotational travel.

4. Apparatus according to claim 3 further comprising a first slideway underneath said input conveying system and a second slideway underneath said output conveying system, said slideways aligning the bottoms of the conveying articles along a horizontal plane and wherein said first slideway further comprises a bent portion which guides articles fed into said drum by said input conveying system against said ribbed portions of said drum.

5. Apparatus according to claim 4 wherein said ribbed portions are provided with a friction coating to aid in the retention of documents.

References Cited in the file of this patent
UNITED STATES PATENTS

| | | |
|---|---|---|
| 847,451 | Wilmore | Mar. 19, 1907 |
| 2,788,118 | Borrowdale | Apr. 9, 1957 |
| 2,947,406 | Hazelton | Aug. 2, 1960 |